July 29, 1924.
J. H. EVERS
1,502,985
CONNECTER FOR TIRE CHAINS
Filed April 11, 1924
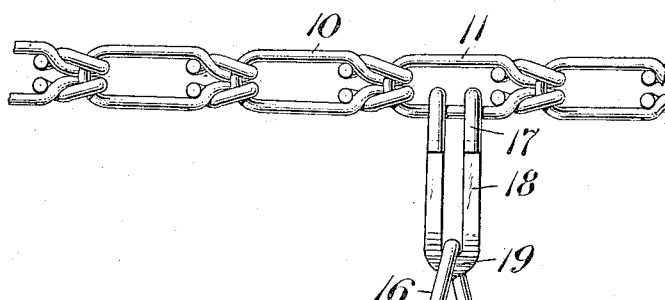
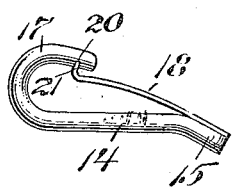
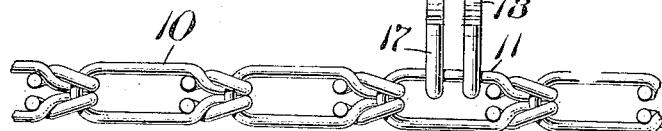
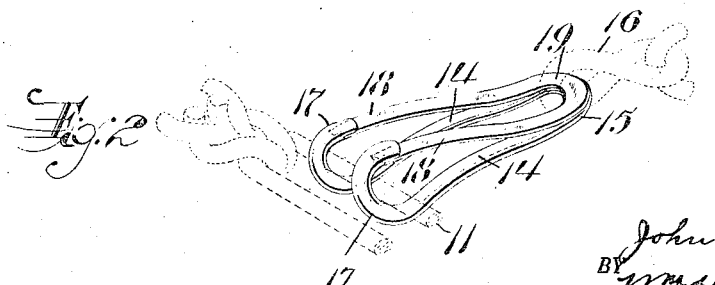
INVENTOR.
John H. Evers,
BY Wm H Caufield
ATTORNEY.

Patented July 29, 1924.

1,502,985

UNITED STATES PATENT OFFICE.

JOHN H. EVERS, OF IRVINGTON, NEW JERSEY.

CONNECTER FOR TIRE CHAINS.

Application filed April 11, 1924. Serial No. 705,722.

*To all whom it may concern:*

Be it known that I, JOHN H. EVERS, a citizen of the United States, and a resident of Irvington, county of Essex and State of New Jersey, have invented certain new and useful Improvements in Connecters for Tire Chains, of which the following is a specification.

This invention relates to an improved connecter for various purposes but is particularly designed for tire chains and is constructed to permit the ready attachment and detachment of the connecter to the side chains and the transverse tread chains.

This connecter thus makes it possible to replace worn or broken tread chains by new ones without the use of tools as the connecter can be manipulated to be easily secured in and disengaged from the tire chain.

The invention is illustrated in the accompanying drawings in which Figure 1 is a top view of a short length of tire chain showing the side chains and a tread chain. Figure 2 is a detail perspective view showing the connecter in full lines and the adjacent chain portions in dotted outline. Figure 3 is a side view of a connecter in modified form.

In the drawings 10 represents the side chains of the tire chain and while in this specification I specify side chains for entirety, it will be evident that the equivalent elements, circumferential or radial, usually used on wheels for holding the tire chain in place can be substituted therefor.

Opposite the links 11 of the side chains, is disposed the tread chain 13 and to connect the tread chain to the side chains I use the connecter which is substantially U-shaped and comprises a shank formed with the arms 14 joined together at the base at 15, this base being usually rounded so as to form a smooth bearing surface for the link 16 at the end of the tread chain.

The arms of the shank are bent to form the hooks 17 which are hooked over the inside strand of each link 11 on the side chain. Secured to the hook is a spring having two arms 18 which have their free ends under the ends of the hooks 17 and are secured to the chain.

I have illustrated the spring as being U-shaped with its bottom portion to fit the curve of the base 15 of the chain and it is secured thereto usually by welding whereby the base 19 of the spring conforms in shape and is securely fastened to the base 15.

When the device is to be secured to the chain by pressing one of the springs 18 close down against its arm 14 of the shank, the link 16 can be passed over the hook end of the spring to its position against the base 15 since the arms 14 are spaced apart to permit the passage of the link to the end of the connecter.

This rounded end of the connecter holds the link 16 central thereto and puts an even pull on each of the hooks 17 when they are snapped over the strand of the link 11 of the side chain or an equivalent fastening device. In case the tread chain 13 becomes broken or is worn out it can be easily replaced without the use of tools since this short-lengthed chain can be placed on the connecters as above described, and the tire chain thus maintained in proper shape and at slight expense as the short tread chains can be cheaply bought.

In Figure 3 I show the hook portion 17 provided with recesses 20 and the springs 18 have their ends bent to form small hooks or fingers 21 so that the spring assists in holding the hooks 17 under abnormal strains which might have a tendency to straighten the hooks 17 out and draw them away from the ends of the spring.

I also show in this construction the base 15 of the hook turned down slightly so that the spring 18, which is substantially straight before it is secured to the shank by this disposition or angular arrangement of the base 15, is placed under an increased spring tension.

I claim:

1. A connecter for tire chains comprising a U-shaped shank and with its ends turned over to form hooks, and a U-shaped spring secured to the base of the shank and with its ends under the hooks.

2. A connecter for tire chains comprising a wire formed with a U-shaped shank with its end formed into hooks and a flat U-shaped spring with its base secured to the base of the shank and with its ends under the ends of the hooks.

3. In a tire chain comprising side chains and a tread chain, a connecter comprising a U-shaped shank with hooks at its ends and a U-shaped spring on the shank with its ends under the hooks, the arms of the shank being spaced apart to receive the end link of the tread chain, the connecter being adapted to be snapped into engagement with the side chain and when detached from the side chain being readily detachable from the tread chain by depressing one of the ends of the spring.

In testimony that I claim the foregoing, I have hereto set my hand, this 8th day of April, 1924.

JOHN H. EVERS.